(12) United States Patent
Franzrahe et al.

(10) Patent No.: US 9,149,763 B2
(45) Date of Patent: Oct. 6, 2015

(54) METHOD FOR REDUCING THE VISIBLE DOWNWIND DETACHED PLUME OPACITY

(71) Applicant: UHDE FERTILIZER TECHNOLOGY B.V., NW Roermond (NL)

(72) Inventors: Harald Franzrahe, Dortmund (DE); Matthias Potthoff, Dortmund (DE); Luc Albert Vanmarcke, Lembecke (BE)

(73) Assignee: UHDE FERTILZER TECHNOLOGY B.V., NW Roermond (NL)

(*) Notice: Subject to any disclaimer, the term of this patent is extended or adjusted under 35 U.S.C. 154(b) by 176 days.

(21) Appl. No.: 13/740,444

(22) Filed: Jan. 14, 2013

(65) Prior Publication Data
US 2014/0178258 A1 Jun. 26, 2014

(30) Foreign Application Priority Data
Dec. 21, 2012 (EP) ..................................... 12008535

(51) Int. Cl.
B01D 53/58 (2006.01)
B01J 2/00 (2006.01)
C05C 9/00 (2006.01)

(52) U.S. Cl.
CPC . B01D 53/58 (2013.01); B01J 2/00 (2013.01); C05C 9/005 (2013.01)

(58) Field of Classification Search
CPC ............ B01D 53/58; B01J 2/00; C05C 9/005
See application file for complete search history.

(56) References Cited

U.S. PATENT DOCUMENTS

| 3,798,021 A | 3/1974 | Bress et al. | |
| 4,370,198 A | 1/1983 | Dencs et al. | |
| 4,493,820 A | 1/1985 | Clausen | |
| 5,779,945 A | 7/1998 | Nijsten et al. | |
| 2011/0064635 A1* | 3/2011 | Niehues et al. | 423/230 |
| 2011/0229394 A1* | 9/2011 | Niehues et al. | 423/238 |

FOREIGN PATENT DOCUMENTS

| DE | 102011016759 | 10/2012 |
| EP | 0514902 | 11/1992 |
| EP | 0853971 | 7/1998 |
| EP | 2119489 | 11/2009 |
| WO | 03099721 | 12/2003 |
| WO | 2010060535 | 6/2010 |

* cited by examiner

Primary Examiner — Duane Smith
Assistant Examiner — Cabrena Holecek
(74) Attorney, Agent, or Firm — Brooks Kushman P.C.

(57) ABSTRACT

The invention relates to a method for reducing aerosol emissions from a urea granulation plant with a recovery of the resulting scrubber bleeds, with
  a granulator producing urea from a concentrated urea solution and an evaporation of the included water, giving urea granulates and an exhaust of dust, ammonia and ammonium cyanate, and
  a following scrubbing or removing stage for the dust, and
  a following scrubbing acid stage, resulting in a first stream comprising mainly aerosols and a second stream comprising ammonium salts, and
  a following aerosol stage with spray and collection devices, releasing a first stream of an exhaust of air, and a second stream of ammonium cyanate and water, and
  the second stream of the aerosol stage of ammonium cyanate and water is recovered into the urea granulation plant or into a urea fertilizer plant.

10 Claims, 2 Drawing Sheets

METHOD FOR REDUCING THE VISIBLE DOWNWIND DETACHED PLUME OPACITY

CROSS-REFERENCE TO RELATED APPLICATIONS

This application claims priority to European Patent Application No. EP 12008535.2 filed Dec. 21, 2012.

BACKGROUND OF THE INVENTION

Field of the Invention

The invention relates to a method for reducing the visible downwind plume opacity caused by aerosol emissions in a urea granulation plant. Also a recovery of the resulting scrubber bleeds is comprised by this process. The method describes a known production of urea granulates in a granulator connected with an inventive sequence of process steps capturing side products as ammonium cyanate, ammonia and water. Ammonium cyanate is usually obtained as aerosol causing the visible downwind detached plume opacity. The invention also relates to a device for the production of urea granulates which makes use of the related method.

Urea is usually produced by crystallizing a concentrated urea melt. The melt is introduced into a granulator which carries out a granulation at elevated temperature and evaporates the water in the melt. The resulting granulated particles are usually obtained in a shape which makes them ready for use in the desired applications. Due to the high temperature, a portion of the urea is converted into ammonium cyanate according to a reversible reaction. The respective chemical equation is:

  $CO(NH_2)_2 \rightleftarrows NH_4OCN$   1.

When spraying this solution in a granulator a great part of ammonium cyanate vaporizes into gaseous ammonia and cyanic acid.

  $NH_4NCO \rightleftarrows N_3+HOCN$   2.

Therefore also $NH_3$ and HOCN are emitted in the granulator. By a condensing reaction aerosols creating the downwind detached plume opacity are created.

Thus the opacity of plumes may be reduced by reducing the concentration of condensible vapors and the in-stack concentration of fine particles, the so-called aerosols. Aerosols are suspended liquid or solid particles ranging in diameter from the submicron range to a size of 10 μm. Particles with diameters approximately equal to the wavelength of visible light (0.4 to 0.8 μm) have the greatest scattering effect and cause the highest opacity. For a given mass emission rate, smaller particles cause a higher opacity effect than larger particles.

The ammonium cyanate further decomposes with water to ammonium carbonate.

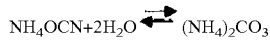  $NH_4OCN+2H_2O \rightleftarrows (NH_4)_2CO_3$   3.

At elevated temperature ammonium carbonate finally results in the formation of carbon dioxide, ammonia and water:

$(NH_4)_2CO_3 \rightarrow 2HN_3+CO_2+H_2O$   4.

In acid solution (less than pH 5) there is a rapid hydrolysis of cyanate. The reaction is too fast to measure at higher temperatures and cyanate can thus be considered to be absent in acid reaction mixtures.

EP2119489A1 describes a known production of urea granulates in a granulator connected with a urea recovery system 15 as shown in FIG. 1, which includes a recovery unit 15 that converts the exhausted ammonia cyanate and water back into urea. The reconverted urea is given into a liquid phase which is then returned into a dust removing or scrubbing system 8. In this method the dust laden air 7 of the granulator 5 is fed into a dust scrubber 8 which removes coarser dust with a less concentrated urea solution. This dust scrubber 8 releases a residual air comprising ammonia, carbon dioxide, water and an aerosol 10. The aerosol comprises mainly ammonium cyanate and a part of very fine urea sublimate. The aerosol is fed into the urea recovery unit 11, in which urea is generated.

A further problem in urea plants is that ammonium salts, which are comprised in the air of granulators as shown above, do not occur in the process and cannot easily be recycled at existing urea facilities. A conventional urea production facility therefore has only the following options to reduce gaseous ammonia emissions and hydrolyzed aerosols from granulation plants:

- to concentrate the diluted ammonium salt solution up to a concentration which can be utilized by other plants, e.g. NPK,
- to product UAS (urea/ammonium sulphate) fertilizer with a high sulphur content,
- to produce UAN (urea/ammonium nitrate) solution,
- to mix with a scrubber solution when using a granulation process equipped with a scrubber system as taught in WO20100650535A1. In WO20100650535A1 a scrubbing of off-gas and recovering of scrubber bleeds is described by a in itself complete closed system, in which ammonium salts are completely contained by the process.

Therefore it would be obvious to combine such an integrated plant as described in WO2010/060535A1 with the invention described in EP2119489A1 to reduce the visible downwind detached plume opacity caused by condensed aerosols.

However the process and sequence of washing steps has several disadvantages. First of all the recycling of the aerosol bleed is expensive because of high temperature equipment that has to be used. In addition, if nitric acid is used in the last acidic scrubbing step of EP2119489A1, this solution will absorb water from the air stream due to the hygroscopic nature of an ammonium nitrate solution. This effect is distracting because a wanted high ammonium salt concentration of 45% cannot be reached. Such a high concentration is desired, if the ammonium salt concentration shall be reintegrated into the process such as described in WO2010/060535A1. This problem is shown in table 1.

TABLE 1

Specific parameters at three different points as shown in FIG. 1 of the process described in EP2119489A1

| point A | | | | point B | | | point C | | | |
|---|---|---|---|---|---|---|---|---|---|---|
| a | b | c | d | e | f | g | h | i | j | k |
| 40 | 6.4 | 86.6 | 0.04 | 7.42 | 100 | 0.046 | 20 | 7.22 | 97.3 | 0.046 |
| | | | | | | | 30 | 6.97 | 93.98 | 0.044 |
| | | | | | | | 40 | 6.08 | 81.87 | 0.038 | a: Urea solution % w/w
b: Partial pressure of water over urea solution in kPa at 40° C.
c: Relative humidity of air in % at 40° C.
d: Specific humidity mass of water vapor per unit mass of moist gas in kg
e: Partial pressure of water saturated air in kPa at 40° C.
f: Relative humidity of air in % at 40° C.
g: Specific humidity mass of water vapor per unit mass of moist gas in kg
h: Ammonium Nitrate solution % w/w TABLE 1-continued Specific parameters at three different points as shown in FIG. 1 of the process described in EP2119489A1

| point A | | | point B | | | point C | | | | |
|---|---|---|---|---|---|---|---|---|---|---|
| a | b | c | d | e | f | g | h | i | j | k | i: Partial pressure of water over ammonium nitrate solutions in kPa at 40° C.
j: Relative humidity of air in % at 40° C.
k: Specific humidity mass of water vapor per unit mass of moist gas in kg In Table 1 the drying capacity of the ammonium salt solution is clearly shown. At point B, which characterizes the air flow after the aerosol stage 11 of FIG. 1 the relative humidity of the air as shown in f is 100%. Therefore the ammonium salt stream 26 leaving the acidic scrubber 13 is diluted by absorbing water from the humidify of the air and cannot easily be recycled back into the process.

It is therefore desirable to find a process which solves the above mentioned problems and which captures the side products ammonium cyanate, ammonia and water and which separates off the ammonium cyanate from the side products from the urea granulation which is usually obtained as a separable aerosol or as fine particles. In addition, the desired process should recover ammonium salts into the production process. The desired process should also supply scrubbing systems for carrying out the related process.

SUMMARY OF THE INVENTION

The invention claims especially a method for reducing aerosol emissions from a urea granulation plat with a recovery of the resulting scrubber bleeds, with
 a granulator producing urea from a concentrated urea solution and an evaporation of the included water, giving urea granulates and an exhaust of dust, ammonia and ammonium cyanate, and
 a following scrubbing or removing stage for the dust, and
 a following scrubbing acid stage, resulting in a first stream comprising mainly aerosols and a second stream comprising ammonium salts, and
 a following aerosol stage with spray and collection devices, releasing a first stream of an exhaust of air, and a second stream of ammonium cyanate and water, and
 the second stream of the aerosol stage of ammonium cyanate and water is recovered into the urea granulation plant or into a urea fertilizer plant.

DETAILED DESCRIPTION OF THE PREFERRED EMBODIMENTS

Figure 1:
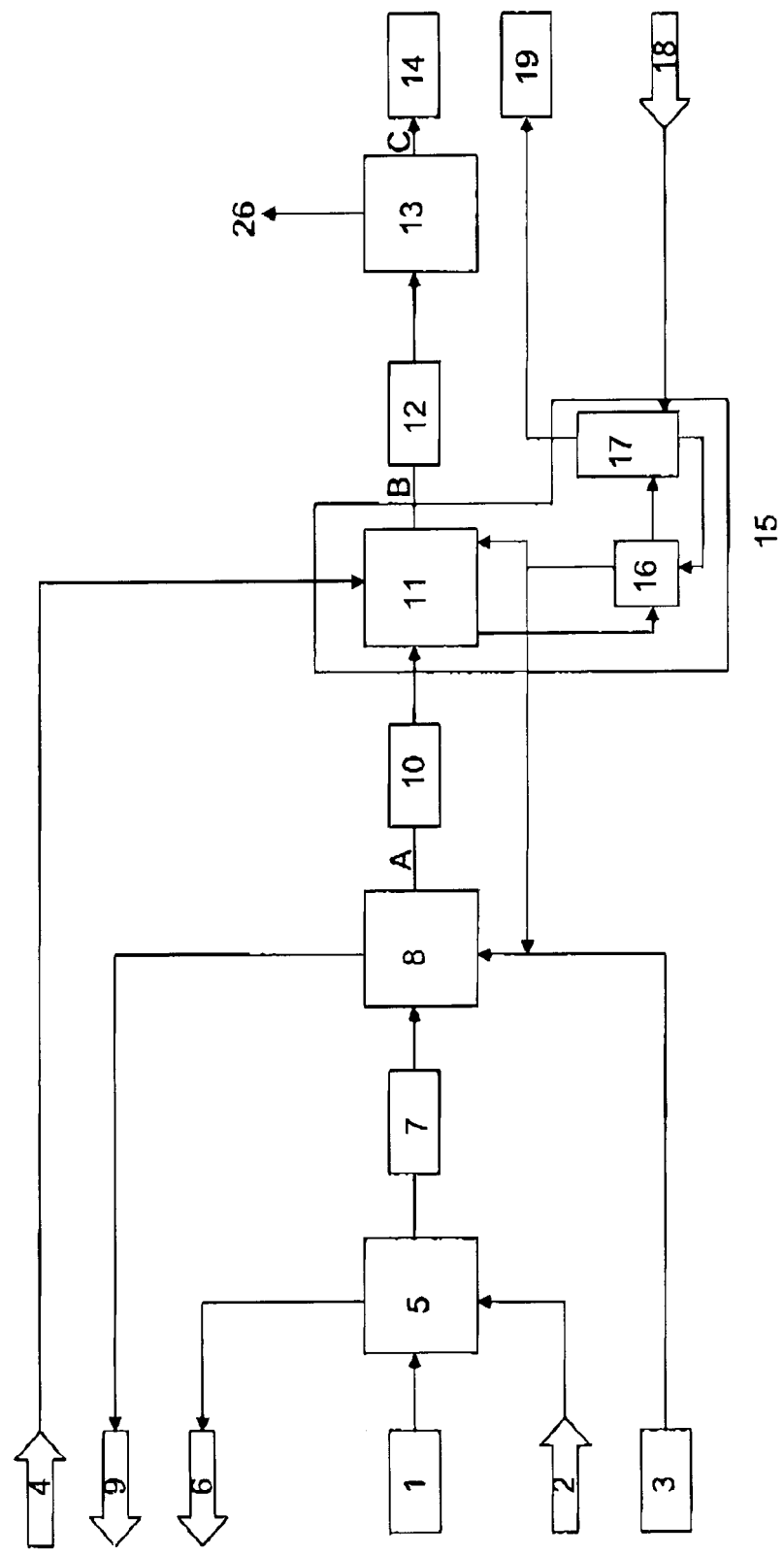
FIG. 1 discloses in schematic form a prior art process.

Surprisingly it has been found that a change in the order of process steps of the process described in EP2119489A1 allows to get rid of the dilution problem of ammonium salts as described above. Therefore ammonium salts resulting out of the inventive process can be further processed without concentration.

The process conditions in the granulation step are usually those which are typically applied for the granulation of urea. A typical concentration of the urea solution as starting material for a granulation is a concentration of 90 to 99 mass percent. The concentration of the feed for the dust removal stage may be of lower concentration. Thus, a solution of urea going to the dust scrubber can be supplied with a smaller concentration of typically 40 to 85 mass percent. Concentration steps may be employed at any process stage. The granulation usually takes place at temperatures of 100 to 130° C. A typical process for the granulation of urea is given in the WO 2005/075383 A1.

Typically, after the granulation, the residual air and dust from the granulation is directed into a dust stage. This stage separates off most of the dust from the production gases like ammonia, and usually consists of ammonium cyanate and residual urea. The air is then directed into a scrubbing acid stage, resulting in a first stream comprising mainly aerosols and a second stream comprising ammonium salts. This stage is followed by an aerosol stage which separates off the fine particles and the aerosols which consist to an overwhelming part of ammonium cyanate and a part of very fine urea sublimate. The aerosol stage is favourably equipped with specially designed spray and collection devices, which allows a proper separation of the aerosols.

Scrubbing stages as used by the current invention for dust scrubbing and acidic scrubbing comprises one or more scrubbers.

In a preferred embodiment of the current invention the second stream of the aerosol stage of ammonium cyanate and water is fed into the second stream of the scrubbing acid stage and this combined stream is used in urea fertilizer plants. Under urea fertilizer plants for the generation of urea/ammonium sulphate fertilizer, urea/ammonium nitrate fertilizer and other plants can be understood.

In an alternative to this embodiment the second stream of the aerosol stage of ammonium cyanate and water is fed into a hydrolysis stage, in which under acidic conditions ammonium salts are generated, which are fed back into the scrubbing acid stage or are used in urea fertilizer plants. For this purpose an acid such as nitric acid is fed into the hydrolyser. The hydrolysis is preferably performed at a temperature between 40° C. and 60° C. By this alternative the recovery of resulting scrubber bleeds is performed using the hydrolysis properties of the generated ammonium salts.

In the inventive process the granulator is fed with a concentrated urea solution with a concentration of 90 to 99 mass percent.

The invented process is not only suitable for the production of granulates. Likewise, it may be employed for the production of urea powder, solutions, aggregated materials or prills.

The patent application also relates to a device for carrying out the mentioned process. The patented device typically comprises a device for producing urea granulates characterized in that the device comprises
 a granulator for the granulation of urea solution, and
 a following scrubber stage for the removal of dust, and
 a following scrubbing acid stage, for the removal of ammonia, urea and part of aerosols, and
 a following aerosol stage for the removal of aerosol with spray systems and collection devices, generating a stream of ammonium cyanate and water and a stream of exhaust air, and
 means for the recovery of ammonium cyanate and water generated in the aerosol stage into the urea granulation plant or into a urea based fertilizer plant.

In a preferred embodiment of the invention the device can also comprises an optional hydrolysis stage, which is installed upstream of the aerosol stage.

The invention is herein described by a drawing which describes the invention, but does not limit the scope of the invention. It serves as a descriptive example.

FIG. 1: Shows schematically the process flow as described in EP2119489A1

Figure 2:
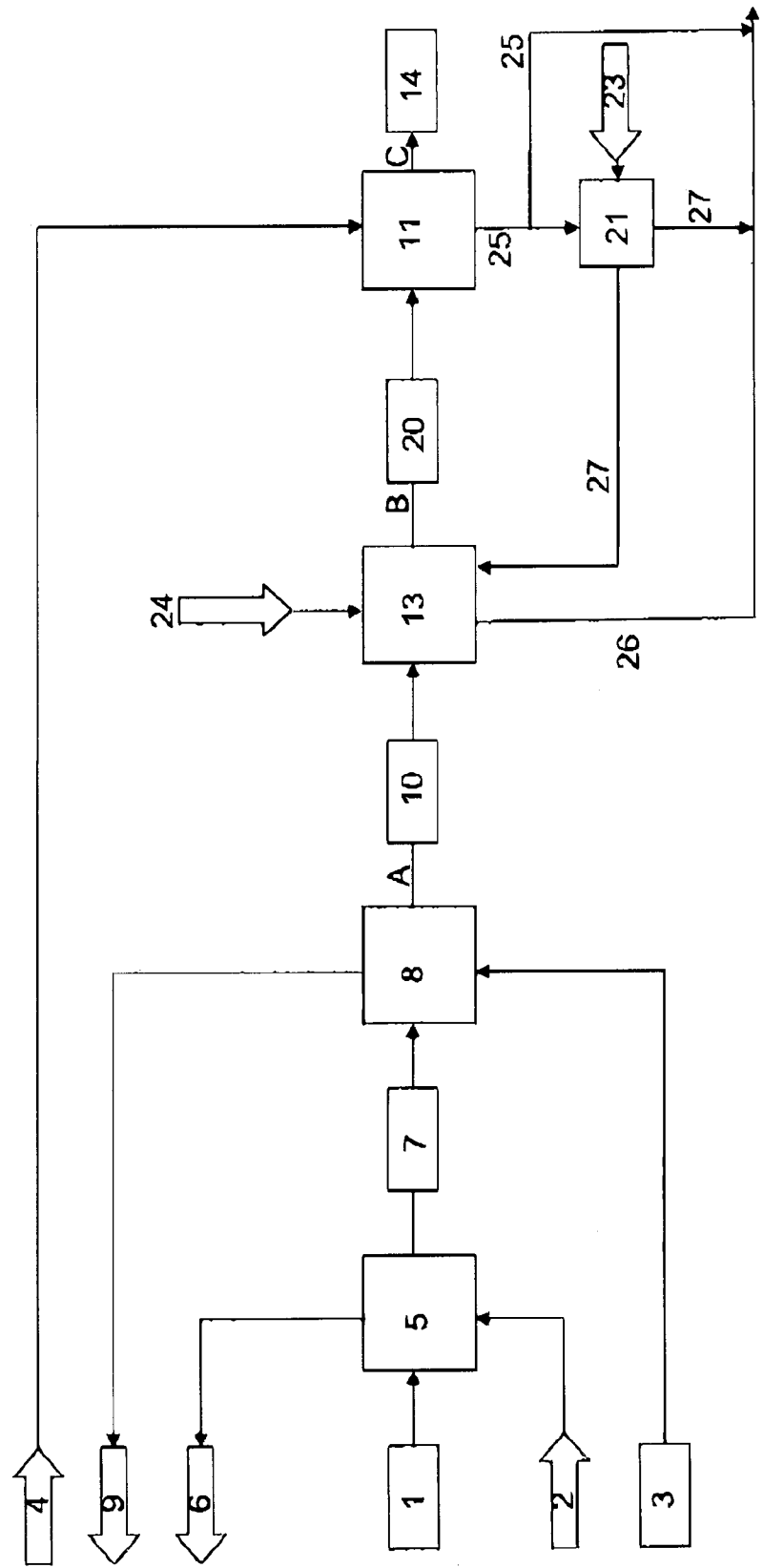
FIG. 2 discloses in schematic form an inventive process.

FIG. 2: Shows schematically the process flow

FIG. 2 shows a process flow of the patented process, starting with the granulator 5 on the left side. Drying air 1 and urea melt 2 of a concentration of 90 to 99 mass percent are used as starting materials for the granulator which produces urea granulates as product. The drying air 1 leaves the granulator 5 as air with dust, ammonia, ammonium cyanate and water 7 and enters a dust scrubber 8. The dust scrubber 8 removes the coarser dust particles from the air. For scrubbing a weakly concentrated urea solution 3 of typically 30 to 85 mass percent is fed into the dust scrubber 8 combing the dust and ammonia removal. The removal of fine dust, ammonia and a part of the submicron aerosols is done in at least one scrubber acid stage 13 resulting in aerosol containing air 20. An Acid 24 is introduced into the scrubbing acid stage 13. A substantial amount of aerosols are removed in the scrubbing acid stage 13. The aerosol containing air 20 and water 4 is fed into an aerosol stage 11 with a specially designed spray and collection devices, releasing a first stream of an exhaust of saturated clean air, which is send as off gas into the atmosphere 14, and a stream of ammonium cyanate and part of very fine urea sublimate 25.

Stream 25 can be treated or used in several ways. In a first option this stream 25 is added to the ammonium salt stream 26 of the scrubbing acid stage 13 for further upgrading to UAN, UAS, NPK or as recycle stream as described in WO2010/060535A1. Another alternative is that the stream 25 is fed with acid 23 into a hydrolysis stage 21. The hydrolysis of ammonium isocyante occurs in a temperature range of 40° C. to 60° C. The stream 27 of the hydrolysis stage 21 is fed back into the scrubbing acid stage 13 or is mixed with stream 26 of the scrubbing acid stage 13 for further processing as upgrading to UAN, UAS NPK or as recycle stream as described in WO2010/060535A1. Streams 25, 26 and 27 are optionally stored in battery limits before further processing occurs. The aerosol stage 11 releases a clean off gas 14 free of ammonia and when vented into the atmosphere nearly no visible downwind detached plume opacity can be seen.

TABLE 2

Specific parameters at three different points as shown in FIG. 2 of the inventive process:

| point A | | | | point B | | | | point C | | |
|---|---|---|---|---|---|---|---|---|---|---|
| a | b | c | d | e | f | g | h | i | j | k |
| 40 | 6.4 | 86.6 | 0.04 | 20 | 7.22 | 97.3 | 0.046 | 7.42 | 100 | 0.047 |
| | | | | 30 | 6.97 | 93.98 | 0.044 | | | |
| | | | | 40 | 6.08 | 81.87 | 0.038 | | | | a: Urea solution % w/w
b: Partial pressure of water over urea solution in kPa at 40° C.
c: Relative humidity of air in % at 40° C.
d: Specific humidity mass of water vapor per unit mass of moist gas in kg
e: Partial pressure of water over ammonium nitrate solutions in kPa at 40° C.
f: Relative humidity of air in % at 40° C.
g: Specific humidity mass of water vapor per unit mass of moist gas in kg
h: Partial pressure of water saturated air in kPa at 40° C.
i: Relative humidity of air in % at 40° C.
j: Specific humidity mass of water vapor per unit mass of moist gas in kg
k: Ammonium Nitrate solution % w/w In Table 2 it is clearly shown that a dilution of the ammonium salt stream of the acid scrubbing stage 13 is avoided. At point A, which characterizes the air flow after the dust scrubbing stage 8 of FIG. 2 the relative humidity of the air as shown in c is reduced. Therefore the undesired dilution of the ammonium salt solution stream 26 is reduced and this stream can be processed in several ways without further treatment as described above.

The advantages of the proposed process are:
changing the sequence of the different washing steps has great economical advantages with less investments compared with the process described in EP2119489A1
fine dust is removed before entering the aerosol stage
due to partly removing and hydrolyzing of the aerosols already in the acidic scrubbing stage and also the removal of ammonia in the acidic scrubbing stage the aerosol removal stage is more efficient:
no ammonia contamination of the clean water sprayed into the aerosol stage, therefore avoiding undesired reactions
less supply of aerosols to the aerosol stage
avoidance of expensive additional high temperature equipment of the aerosol recovery system described in EP2119489A1
better humidity profile of the air entering the acid scrubbing stage avoiding drying the air with the possibility to obtain a higher salt concentration upto 50% releasing the acid scrubbing stage. This results in a more efficient upgrading in the battery limit for further processing.

KEY TO REFERENCED ITEMS

1 Drying air
2 Urea melt
3 Weakly concentrated urea solution
4 Water
5 Granulator
6 Product
7 Air with dust, ammonia, cyanate
8 Dust scrubber
9 Evaporation
10 Air with ammonia, cyanate
11 Aerosol separation stage
12 Air with ammonia
13 Scrubber acid stage
14 Off-gas to atmosphere
15 Recovery system
16 Heat exchanger
17 Recovery unit
18 Low pressure steam
19 Ammonia, carbon dioxide, water
20 Aerosol containing air
21 Hydrolysis stage
23 Acid to be fed into hydrolysis stage
24 Acid to be fed into Scrubbing acid stage
25 Stream of ammonium cyanate and part of fine urea sublimate
26 Ammonium salt stream
27 Stream of the hydrolysis stage

The invention claimed is:

1. A method for reducing aerosol emissions from a urea granulation plant with a recovery of the resulting scrubber bleeds, comprising:
producing urea granulates in a granulator by evaporating water from a concentrated urea solution and giving urea granulates and an exhaust of dust, ammonia and ammonium cyanate, and
removing dust from the exhaust by scrubbing the exhaust in a scrubbing stage or removing the dust from the exhaust in a removing stage, and
scrubbing a stream containing dust, ammonia, urea, and aerosols in an acid scrubbing stage, the acid scrubbing stage providing a first stream comprising mainly aerosols and a second stream comprising ammonium salts, and releasing a first stream of an exhaust of air, and a second stream of ammonium cyanate and water in an aerosol stage with spray and collection devices, and recovering the second stream of ammonium cyanate and water from the aerosol stage into the urea granulation plant or into a urea based fertilizer plant.

2. The method for reducing aerosol emissions of claim 1, wherein the concentrated urea solution has a urea concentration of 90 to 99 mass percent.

3. The method for reducing aerosol emissions of claim 1, wherein the second stream of ammonium cyanate and water from the aerosol stage is fed into the second stream from the acid scrubbing stage and this combined stream is used in a urea-based fertilizer plant.

4. The method for reducing aerosol emissions of claim 3, wherein the concentrated urea solution has a urea concentration of 90 to 99 mass percent.

5. The method for reducing aerosol emissions of claim 1, wherein the second stream ammonium cyanate and water from the aerosol stage is fed into a hydrolysis stage, in which under acidic conditions ammonium salts are generated, which are fed back into the acid scrubbing stage or are used in urea based fertilizer plants.

6. The method for reducing aerosol emissions of claim 5, wherein the hydrolysis stage is fed with an acid, and hydrolysis is performed between 40° C. and 60° C.

7. The method for reducing aerosol emissions of claim 5, wherein the concentrated urea solution has a urea concentration of 90 to 99 mass percent.

8. The method for reducing aerosol emissions of claim 6, wherein the concentrated urea solution has a urea concentration of 90 to 99 mass percent.

9. A device for producing urea granulates, comprising:
a granulator for the granulation of a urea solution, and
a scrubber stage for the removal of dust downstream from the granulator, and
an acid scrubbing stage downstream of the scrubber stage, for the removal of ammonia, urea and part of aerosols, and
an aerosol stage downstream of the acid scrubbing stage for the removal of aerosol with spray systems and collection devices, generating a stream of ammonium cyanate and water and a stream of exhaust air, and
a recovery stage for the recovery of ammonium cyanate and water generated in the aerosol stage into the urea granulation plant or into a urea based fertilizer plant.

10. The device for producing urea granulates of claim 9, wherein the device comprises a hydrolysis stage, which is installed upstream of the aerosol stage.

* * * * *